US010815550B2

(12) United States Patent
Dimitrakis et al.

(10) Patent No.: US 10,815,550 B2
(45) Date of Patent: Oct. 27, 2020

(54) HEAP LEACHING

(71) Applicant: Technological Resources Pty. Limited, Melbourne (AU)

(72) Inventors: Georgios Dimitrakis, Nottingham (GB); Samuel Kingman, Burton upon Trent (GB); Paula Palade, Beeston (GB); Andrew Batchelor, Nottingham (GB); Aled Jones, Nottingham (GB); Grant Ashley Wellwood, Mindarie (AU); Christopher Geoffrey Goodes, Hampton (AU); Juliano Katrib, Beeston (GB); Christopher Dodds, Nottingham (GB)

(73) Assignee: Technological Resources Pty. Limited, Melbourne (AU)

( * ) Notice: Subject to any disclaimer, the term of this patent is extended or adjusted under 35 U.S.C. 154(b) by 131 days.

(21) Appl. No.: 16/113,400

(22) Filed: Aug. 27, 2018

(65) Prior Publication Data

US 2018/0363100 A1 Dec. 20, 2018

Related U.S. Application Data

(62) Division of application No. 14/443,104, filed as application No. PCT/AU2013/001324 on Nov. 15, 2013, now Pat. No. 10,060,008.

(30) Foreign Application Priority Data

Nov. 15, 2012 (AU) .................................. 2012904968

(51) Int. Cl.
*C22B 15/00* (2006.01)
*C22B 3/08* (2006.01)
(Continued)

(52) U.S. Cl.
CPC ............ *C22B 15/0071* (2013.01); *C22B 3/02* (2013.01); *C22B 3/04* (2013.01); *C22B 3/06* (2013.01);
(Continued)

(58) Field of Classification Search
CPC ......... C22B 15/0071; C22B 3/08; C22B 4/04; C22B 3/18; C22B 15/0067; C22B 3/04;
(Continued)

(56) References Cited

U.S. PATENT DOCUMENTS 3,777,004 A 12/1973 Lankenau et al.
4,756,887 A 7/1988 Lesty et al.
(Continued)

FOREIGN PATENT DOCUMENTS

CA 2363762 A1 5/2003
WO 2007140554 A1 12/2007
WO 2011075768 A1 6/2011

OTHER PUBLICATIONS

International Search Report dated Feb. 5, 2014 (PCT/AU2013/001324); ISA/AU.
(Continued)

*Primary Examiner* — Anthony J Zimmer
(74) *Attorney, Agent, or Firm* — Banner & Witcoff, Ltd.

(57) ABSTRACT

A heap of a material to be leached to recover a valuable metal from the material includes an electromagnetic heating system to generate heat in situ in the heap.

25 Claims, 5 Drawing Sheets

(51) Int. Cl.
  *C22B 3/18* (2006.01)
  *C22B 4/04* (2006.01)
  *H05B 6/64* (2006.01)
  *C22B 3/02* (2006.01)
  *C22B 3/04* (2006.01)
  *C22B 3/06* (2006.01)

(52) U.S. Cl.
  CPC ............... *C22B 3/08* (2013.01); *C22B 3/18* (2013.01); *C22B 4/04* (2013.01); *C22B 15/0067* (2013.01); *H05B 6/64* (2013.01); *Y02P 10/234* (2015.11); *Y02P 10/236* (2015.11)

(58) Field of Classification Search
  CPC .... C22B 3/02; C22B 3/06; H05B 6/64; Y02P 10/234; Y02P 10/236
  See application file for complete search history.

(56) References Cited

U.S. PATENT DOCUMENTS

| | | |
|---|---|---|
| 5,024,740 A | 6/1991 | Birken et al. |
| 6,110,253 A | 8/2000 | Kohr et al. |
| 6,277,168 B1 * | 8/2001 | Huang ............... C21B 13/008 75/10.13 |
| 7,459,006 B2 | 12/2008 | Ridler |
| 2006/0096415 A1 | 5/2006 | Batterham et al. |
| 2008/0178706 A1 | 7/2008 | Du Plessis et al. |
| 2009/0183597 A1 | 7/2009 | Roy et al. |
| 2014/0322106 A1 | 10/2014 | Dimitrakis et al. |

OTHER PUBLICATIONS

Trexler, Dennis T. et al., "Heap Leaching," GHC Bulletin, Summer 1990, pp. 1-4.

* cited by examiner

HEAP LEACHING

CROSS-REFERENCE TO RELATED APPLICATIONS

The present application is a divisional application of U.S. application Ser. No. 14/443,104 filed on May 15, 2015, titled "Heap Leaching", which is a U.S. National Phase filing of International Application No. PCT/AU2013/001324, filed on Nov. 15, 2013, designating the United States of America and claiming priority to Australian Patent Application No. 2012904968 filed Nov. 15, 2012, and the present application claims priority to and the benefit of both the above-identified applications, which are incorporated by reference herein in their entireties.

TECHNICAL FIELD

The present invention relates to leaching a material containing a valuable metal.

The present invention relates particularly, although by no means exclusively, to leaching a material in the form of a sulphidic ore containing a valuable metal.

The present invention relates particularly, although by no means exclusively, to leaching a sulphidic copper-containing ore that includes copper-containing minerals, such as chalcopyrite.

BACKGROUND ART

In conventional heap and dump leaching of copper sulphide containing minerals, mined ore is stacked into heaps, aerated through direct injection of air via aeration pipes extending into the heap and/or by natural convection through exposed sides of the heap, irrigated with an acid solution for extraction of copper into solution, and the copper is subsequently recovered from solution by a range of recovery options including solvent extraction and electrowinning (SX/EW), cementation onto more active metals such as iron, hydrogen reduction, and direct electrowinning. Leaching may be enhanced by the use of microorganisms, such as acidophilic bacteria that grow on the surface and in the cracks of ore fragments in a heap.

Generally, heap and dump leaching (hereinafter referred to as "heap leaching") provides lower metal recoveries than other metallurgical process options for recovering copper from copper-containing ores, such as milling and flotation that produces copper-containing concentrates that are then smelted to produce copper metal. Consequently, heap leaching tends to be reserved for low grade ore types (typically, 0.5-2 wt. %) that have at least a proportion of readily recovered copper, but where crushing/milling costs per unit of copper are too high to support a concentrator approach, or where mineral liberation and other characteristics (e.g. arsenic content) will not support production of directly useable or saleable concentrates.

The above description is not to be taken as an admission of the common general knowledge in Australia or elsewhere.

SUMMARY OF THE DISCLOSURE

The applicant, through a group company and research partners, has carried out research and development work on heap leaching copper-containing ores and has made a number of findings in the course of the heap leaching work and in the course of work on other technology projects. The present invention is an outcome of those findings.

Temperature control in a heap is an important issue from the viewpoint of having leaching reactions occur at an acceptable rate. Temperature control may be an issue at start-up and during the course of a heap leaching operation. The temperature requirements may vary during the course of a heap leaching operation due to reactions within the heap and external conditions such as external temperature. By way of example, one of the challenges of a heap leaching operation, particularly when the grade is low and the climate is cold, is getting the internal temperature of a heap to a point where reactions are self-sustaining at an acceptable rate. Moreover, temperature control at scale within a heap is difficult, especially in cold conditions and often results in conventional heap leaching operations being limited to achieving high extraction rates.

The present invention is based on a realisation made during the course of the research and development work that electromagnetic radiation, particularly radio frequency radiation, can selectively heat a leach solution and/or sulphide mineralisation (depending on mineralogy) common to copper bearing ores and not heat the host rock, i.e. gangue, and is useful on this basis.

In general terms the present invention provides a heap of a material to be leached to recover a valuable metal from the material, the heap including an electromagnetic heating system to generate heat in situ in the heap.

The term "electromagnetic heating system" is understood herein to mean any system based on the use of an electromagnetic field to generate heat directly or indirectly in a heap of a material.

The present invention may provide a heap of a material to be leached to recover a valuable metal from the material, the heap including an electromagnetic heating system in the form of a system for exposing the heap to electromagnetic radiation to generate heat in situ in the heap.

The system for exposing the heap to electromagnetic radiation may be operable to selectively heat minerals containing valuable metal compared to non-valuable gangue material in the heap.

The system for exposing the heap to electromagnetic radiation may be operable to heat minerals containing valuable metal to a uniform temperature range throughout at least a substantial part, typically at least 90% of the heap.

The system for exposing the heap to electromagnetic radiation may be operable to selectively heat leach liquor compared to non-valuable gangue material in the heap. The research and development work found that selectively heating leach liquor compared to non-valuable gangue material is an effective way of heating the whole heap to a uniform temperature range. Typically, leach liquor is well distributed through a heap and there is heat transfer via conduction from the liquor to the surrounding heap material.

The system for exposing the heap to electromagnetic radiation may be operable to heat leach liquor to a uniform temperature range throughout at least a substantial part, typically at least 90% of the heap.

The system for exposing the heap to electromagnetic radiation may be operable to heat the heap liquor to at least 50° C., preferably in the range between 45° C. and 65° C., and typically about 55° C. when the material in the heap includes sulphidic copper-containing ore with chalcopyrite as a copper-containing mineral in the ore.

The system for exposing the heap to electromagnetic radiation may be operable to heat the heap liquor to less than 85° C. when the material in the heap includes sulphidic copper-containing ore with chalcopyrite as a copper-containing mineral in the ore.

In situations where the material includes sulphidic ore containing a valuable metal and a leaching operation on the heap uses acidic leach liquor, the electromagnetic radiation system heats the metal sulphides and the leach liquor and generates heat to initiate and maintain reactions in the heap.

The electromagnetic radiation may be any suitable radiation.

The electromagnetic radiation may be radio frequency radiation.

The electromagnetic radiation may be in a lower frequency end of the radio frequency radiation band of radiation.

The lower frequency end of the radio frequency radiation band of radiation may be 1-100 MHz.

The radio frequency radiation may preferably be selected to be between 5-45 MHz.

In situations in which the electromagnetic radiation is radio frequency radiation, the system for exposing the heap to electromagnetic radiation may include a radio frequency generator, an array of electrodes to radiate the radio frequency energy into the heap, and transmission lines interconnecting the radio frequency generator and the electrodes. Reference in the specification to electrodes includes reference to antennae.

By way of example, the system for exposing the heap to electromagnetic radiation may include a series of spaced-apart electrodes positioned in the heap and an electrical source connected to the electrodes that is operable to generate electromagnetic waves that have the frequency in the radio frequency band.

The electrodes may be arranged to extend vertically into the heap.

The electrodes may be arranged to extend horizontally into the heap.

The electrodes may be in the form of an elongate central conductor and an outer coaxial conductor, with an annular gap between the conductors.

The electrodes may be in any suitable form and any suitable arrangement. The size and spacing and orientation of the electrodes may be selected as required.

By way of example, each electrode may include an elongate central conductor and an outer coaxial conductor, with an annular gap between the conductors.

The heap may include an array of sleeves extending into the heap and the electrodes may be replaceably positioned in the sleeves.

The sleeves may be made from material that is transparent to the electromagnetic radiation.

The system for exposing the heap to electromagnetic radiation may include a shield to confine the electromagnetic radiation within the heap.

The shield may be in the form of metal mesh on the outside of the heap that acts as a Faraday cage that prevents electromagnetic radiation being transmitted outside the heap.

The heap may be any suitable size and shape. By way of example, the heap may be elongate with a pair of parallel longer sides and a pair of parallel shorter sides (which may be described as "ends").

The material may be a sulphidic ore containing a valuable metal.

The sulphidic ore may be a sulphidic copper-containing ore that includes copper-containing minerals.

The copper-containing minerals may include chalcopyrite.

The heap may include an aeration system for supplying air to the heap under natural convection or forced air flow conditions.

The heap may include a system for supplying leach liquor to the heap for leaching the valuable metal from the material in the heap.

The leach liquor may be an acidic solution, typically pH 1.5-2.

The acidic solution may include sulphuric acid.

The leach liquor may be pre-heated.

The heap may include a system for draining a pregnant leach solution that contains the valuable metal leached from the material in the heap from the heap.

In general terms, the present invention also provides a method of heap leaching a valuable metal from a material that includes the steps of (a) supplying a leach liquor to a heap of the material to leach the valuable metal from the material and (b) controlling the temperature in the heap by electromagnetic heating that generates heat in situ in the heap during the course of the method.

The present invention may provide a method of heap leaching a valuable metal from a material that includes the steps of (a) supplying a leach liquor to a heap of the material to leach the valuable metal from the material and (b) controlling the temperature in the heap by electromagnetic heating by exposing the heap to electromagnetic radiation to generate heat in situ in the heap during the course of the method.

The term "electromagnetic heating" is understood herein to mean using an electromagnetic field to generate heat directly or indirectly in a heap of a material.

Step (b) may include controlling the temperature in the heap by exposing the heap to electromagnetic radiation and selectively heating minerals containing valuable metal compared to non-valuable gangue material in the heap.

Step (b) may include controlling the temperature in the heap by exposing the heap to electromagnetic radiation and selectively heating leach liquor compared to non-valuable gangue material in the heap.

Step (b) may include controlling the temperature in the heap by exposing the heap to electromagnetic radiation and selectively heating leach liquor to at least 50° C., preferably in the range between 45° C. and 65° C., and typically about 55° C. when the material in the heap includes sulphidic copper-containing ore with chalcopyrite as a copper-containing mineral in the ore.

Step (b) may include controlling the temperature in the heap by exposing the heap to electromagnetic radiation and selectively heating leach liquor to less than 85° C. when the material in the heap includes sulphidic copper-containing ore with chalcopyrite as a copper-containing mineral in the ore.

The method may include operating the electromagnetic radiation system as required so that the temperature of the heap is within a target temperature range.

The method may include monitoring the heap temperature and exposing the heap to electromagnetic radiation as required having regard to the monitored temperature so that the temperature of the heap is within a target temperature range.

The target temperature range may be a range that applies across the whole heap.

Alternatively, the target temperature range may be different ranges in different sections of the heap. For example, there may be a higher target temperature range in an outer section of the heap than in an inner section of the heap.

The method may include aerating the heap.

The method may include supplying leach liquor to the heap for leaching the valuable metal from the material in the heap.

The method may include collecting a pregnant leach solution that contains the valuable metal leached from the material and recovering the valuable metal from the pregnant leach solution.

The material may be a sulphidic ore containing a valuable metal.

The sulphidic ore may be a sulphidic copper-containing ore that includes copper-containing minerals, such as chalcopyrite.

In the case of sulphidic copper-containing ore that include copper-containing minerals, step (b) may include controlling the temperature in the heap to be at least 50° C.

BRIEF DESCRIPTION OF THE DRAWINGS

The present invention is described further with reference to the accompanying drawings, of which.

SPECIFIC DESCRIPTION OF EMBODIMENTS

The following description is in the context of heap leaching a sulphidic copper-containing ore. It is emphasised that the present invention is not confined to this type of ore and extends more generally to any material that includes a valuable metal.

The recovery of copper using heap leaching systems is a proven technology and has been used successfully used. The performance of these systems is primarily governed by the temperature within the heap, and this has been reported in both laboratory and field studies. The numerous bacterial strains used in such systems have particular temperature windows in which they proliferate and drive the extraction of soluble copper into leach solutions. If these temperature regions are not reached then recovery of copper can be poor.

Controlling the temperature within heap leaching systems that rely on bacterial activity is essential, particularly in cold environmental conditions, to allow acidophilic bacteria to grow. Yet the large number of complex and dependant chemical steps, as well as the influence of temperature altering process conditions such as air flow, irrigation rate, and evaporation makes control of the temperature difficult, if not impossible, with the current state of the art.

The applicant has found that electromagnetic heating, as described above, makes it possible to selectively heat a leach solution and/or sulphide mineralisation common to copper-bearing ores over the host rock, i.e. the gangue. As a consequence, the localised temperature of the environment around the acidophilic microbes attached to the surface sulphide mineralisation can therefore, be optimised, to enhance both the rate, and overall copper recovery.

In particular, the research and development work mentioned above found that the application of electromagnetic energy to sulphidic copper-containing ores in a heap leach could produce near instantaneous, in situ, volumetric and phase selective heating of the leach solution in the heap. The work found that selectively heating leach liquor compared to non-valuable gangue material is an effective way of heating the whole heap to a uniform temperature range. Typically, leach liquor is well distributed through a heap and there is heat transfer via conduction from the liquor to the surrounding heap material.

The use of energy in the radio frequency range of the electromagnetic radiation spectrum is preferred because the penetration depth is proportional to the wavelength of the applied electromagnetic energy and this is of the order of tens if not hundreds of meters in the radio frequency range. Therefore, the separation between radiating electrodes can also be of the same order, allowing economical design of a radio-frequency heating system. In addition, the heating selectively also increases at longer wavelengths.

Figure 2:
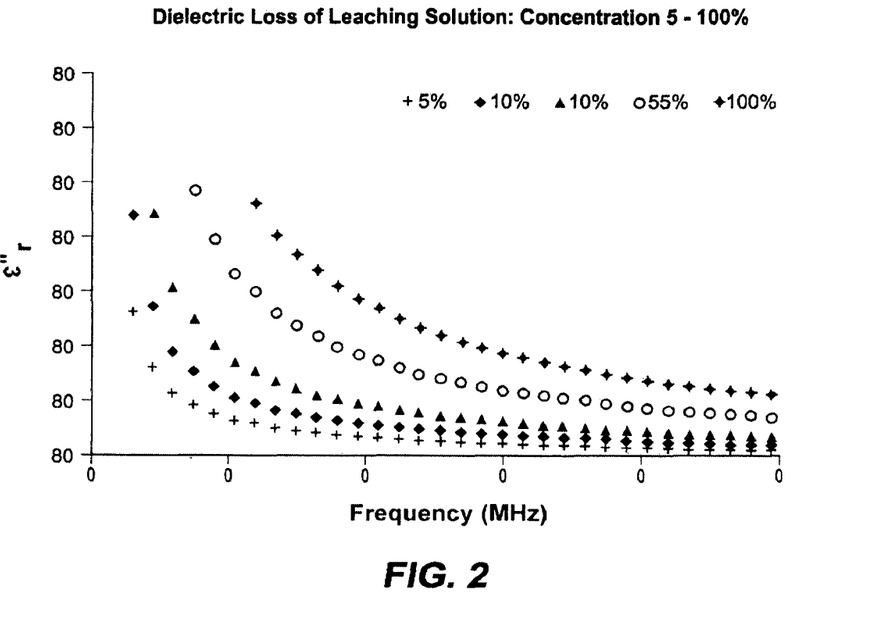
FIG. 2 is a graph of loss factor ($\varepsilon''$) against frequency at ISM bands for different concentrations of standard sulphuric acid leach liquor used to leach copper-bearing ores.
Figure 3:
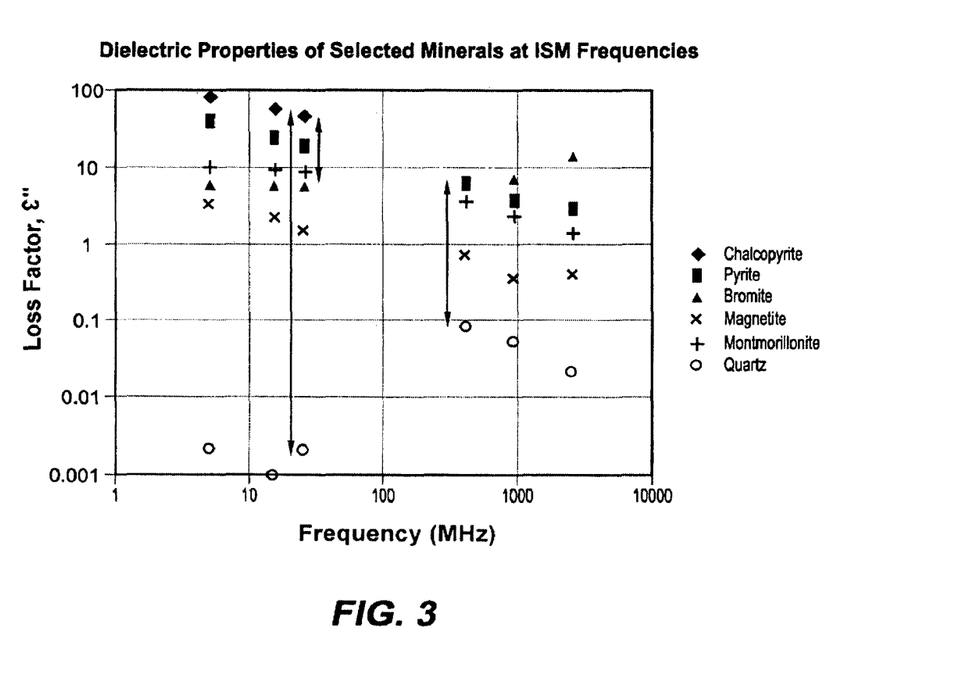
FIG. 3 is a graph of loss factor ($\varepsilon''$) against frequency at ISM bands for some common minerals found in copper-bearing ores.

FIG. 2 is a graph of loss factor ($\varepsilon''$) against frequency at ISM bands for different concentrations of standard sulphuric acid leach liquor used to leach copper-bearing ores. FIG. 3 is a graph of loss factor ($\varepsilon''$) against frequency at ISM bands for some common minerals found in copper-bearing ores.

The graph of FIG. 3 shows greater separation between mineralisation of interest, such as chalcopyrite, and gangue at lower frequencies. Quartz is often the predominant mineral in common copper-bearing ores and is essentially transparent to radio frequency energy, given its very low dielectric loss ($\varepsilon''$). Yet the primary copper mineral—chalcopyrite—has, relatively, a very dielectric high loss. So it exhibits a much greater degree of heating in the same radio frequency field. It then follows that mineralogical composition of an ore fragment defines its heating response. Those fragments high in chalcopyrite will heat better than those that have comparatively less chalcopyrite.

It can be seen from FIG. 2 that (a) the loss factor for each acid concentration decreases as the frequency of the applied electromagnetic energy increases and (b) the loss factor at a given frequency increases with acid concentration of the leach liquor. It can be seen from FIG. 3 that as the frequency of the applied electromagnetic energy decreases, the spread in measured loss factors of the selected minerals increases. It can also be seen from a comparison of FIGS. 2 and 3 that the loss factors of the leach liquor across the concentration range at lower frequencies of the applied electromagnetic energy is significantly higher than the loss factors for the selected minerals, including chalcopyrite which has a high loss factor. For example, at 20 MHz, the loss factor for a 10% sulphuric acid leach liquor is approximately 400 and the loss factor for chalcopyrite is approximately 70. Given that loss factor is essentially a measure of heating in response to an applied field, it can be inferred from these results that at lower frequencies, typically less than 100 MHz, significant heating of leach liquor is possible and greater degrees of selective heating of minerals can be achieved. The radio frequency radiation is preferably selected to be between 5-45 MHz, more particularly with a wavelength in the region of 25 metres.

It is the above-described selective heating of leach liquor and phase-selective heating of valuable minerals (such as chalcopyrite) and non-valuable minerals (such as quartz) that underpins the mineral processing technology of the invention.

Given the large-scale of heap leaching operations, heating the bulk agglomerate of the ore heap to the required temperature for microbial activation, would require huge energy input, and be prohibitively uneconomical. By delivering targeted radio frequency energy to selectively heat the leach solution and/or sulphide mineralisation (to which the acidophilic microbes are attached), the optimum temperature for acidophilic microbial proliferation can be achieved without wasting energy heating the bulk ore from which no benefit is derived in terms of copper recovery.

In a heap leaching system the mineral ore is subjected to a series of crushing and screening processes to prepare agglomerates or a concentrate which is then placed on a leach pad. This leach pad includes an impermeable geotextile on which a series of air pipes and collection lines are laid. Drip lines are then placed across the top of the ore bed, through which an acidic leach solution is applied to the top of the ore heap. The composition of the leach solution is typically a relatively dilute sulphuric acid solution at pH 1.5-2 and an oxidiser. But in the case of bioleaching, a bacterial inoculate is used in place of a chemical oxidiser. As the solution passes through the agglomerated ore, metals are extracted into the solution as a soluble salt. These are then stripped from the pregnant leach solution by solvent extraction. The metal of interest is when extracted the electrolyte solution by electrowinning to produce a high purity cathode metal. The leach solution is then recycled into the irrigation system.

The heaps shown in FIGS. 4, 5 and 7-9 are standard forms in terms of the basic shape and size of the heaps and insofar as the heaps include mined ore that has been processed, for example by being crushed and screened, in accordance with standard practice for forming heaps. More specifically, the present invention does not extend to the particular shape and size of the heap and does not extend to the physical characteristics of the ore. In addition, more specifically, the present invention also extends to heaps of previously discarded material from mining operations.

Figure 4:
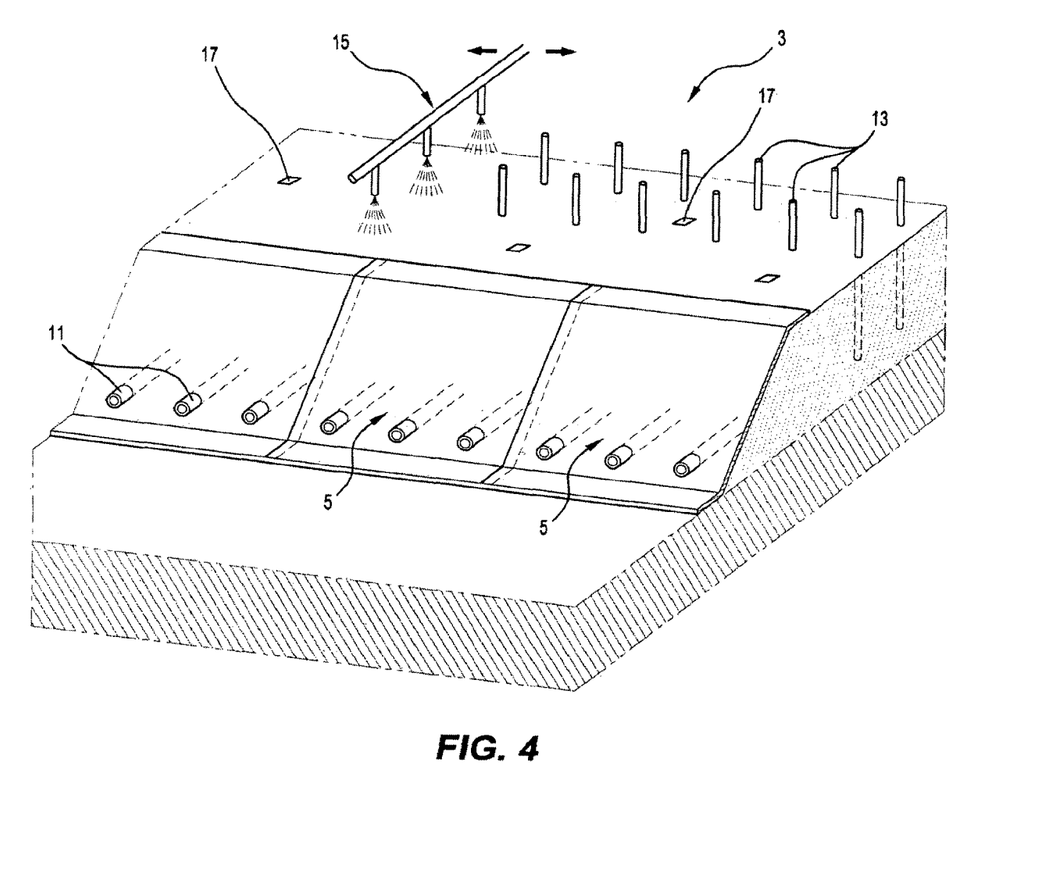
FIG. 4 is a perspective view of one embodiment of a heap of a material containing a valuable metal to be leached in accordance with the present invention.
Figure 5:
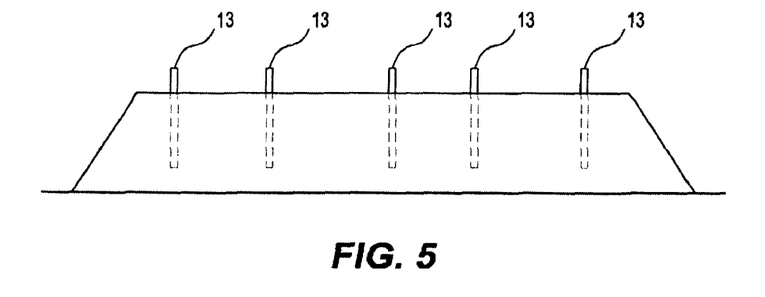
FIG. 5 is a vertical cross-section through a section of the heap shown in FIG. 3 which illustrates the arrangement of electrodes in the heap in that section of the heap in very diagrammatic form.

The embodiment of the heap shown in FIGS. 4 and 5 is basically elongate with a pair of parallel inclined longer sides and a pair of parallel inclined shorter sides (which may be described as "ends") that extend around the entire perimeter of the heap, and with a generally flat top.

With reference to the FIG. 4, the heap of the sulphidic copper-containing ore includes:

(a) a system generally identified by the numeral 3 for exposing the heap to electromagnetic radiation in the form of radio frequency radiation to selectively generate heat in the heap;

(b) an air impermeable barrier in the form of a plurality of prefabricated panels 5 positioned on the sides of the heap to exclude air flow through the sides;

(c) an aeration system to allow controlled air flow into the heap as required during the course of a heap leaching operation, the aeration system including a plurality of aeration pipes 11 that extend horizontally through openings in the panels 5 into the heap, and the aeration system being arranged to supply air to the heap under natural convection or forced air flow conditions;

(d) a system generally identified by the numeral 15 for supplying a leach liquor to the top of the heap so that the leach liquor can flow downwardly through the heap and leach copper from the ore; and (e) a system (not shown) for discharging a pregnant leach solution that contains copper in solution that has been leached from the ore from the heap in a way that prevents flow of air into the heap via the discharge system.

The electromagnetic radiation system 3 makes it possible to control the temperature of the leach liquor in the heap to a target temperature range substantially throughout the whole of the heap or to different target temperature ranges in different sections of the heap. The system 3 is suitable for use on large size heaps.

More particularly, when the electromagnetic radiation is selected to be radio frequency radiation toward the lower end of the radio frequency band, such as 1-100 MHz, the ore penetration can be tens and up to hundreds of meters and thus provides an effective heating option for large heaps. Nevertheless, it is often preferable to have a minimum electric field value which will decay exponentially away from the electrode so the distance one electrode can heat in reality will be 10's of meters and not hundreds of meters.

Moreover, on a microscopic scale, radio frequency radiation can heat copper-containing minerals and the leach liquor very rapidly, which provides an opportunity for selective heating and leaching at the location of the valuable metal and, in particular, heating at the solid liquid interface. This is important in terms of leaching rate and recovery.

The electromagnetic radiation system 3 shown in FIGS. 4 and 5 includes (i) a plurality of spaced-apart electrodes 13 arranged to extend vertically (or in any other suitable orientation) into the heap, (ii) an electrical source (not shown) connected to the electrodes and operable to generate electromagnetic waves that have a frequency in the radio frequency band, whereby in use radio frequency radiation is transmitted from the electrodes 13, (iii) a plurality of temperature sensors 17 for measuring the temperature of the heap (and externally of the heap) in selected locations, and (iv) a controller (not shown) for receiving and processing the detected temperature data and controlling the operation of the electrical source to vary the operation of the electrical source in response to the detected temperatures as required to achieve a target temperature range within the heap or different target temperature ranges in different sections of the heap.

Figure 1:
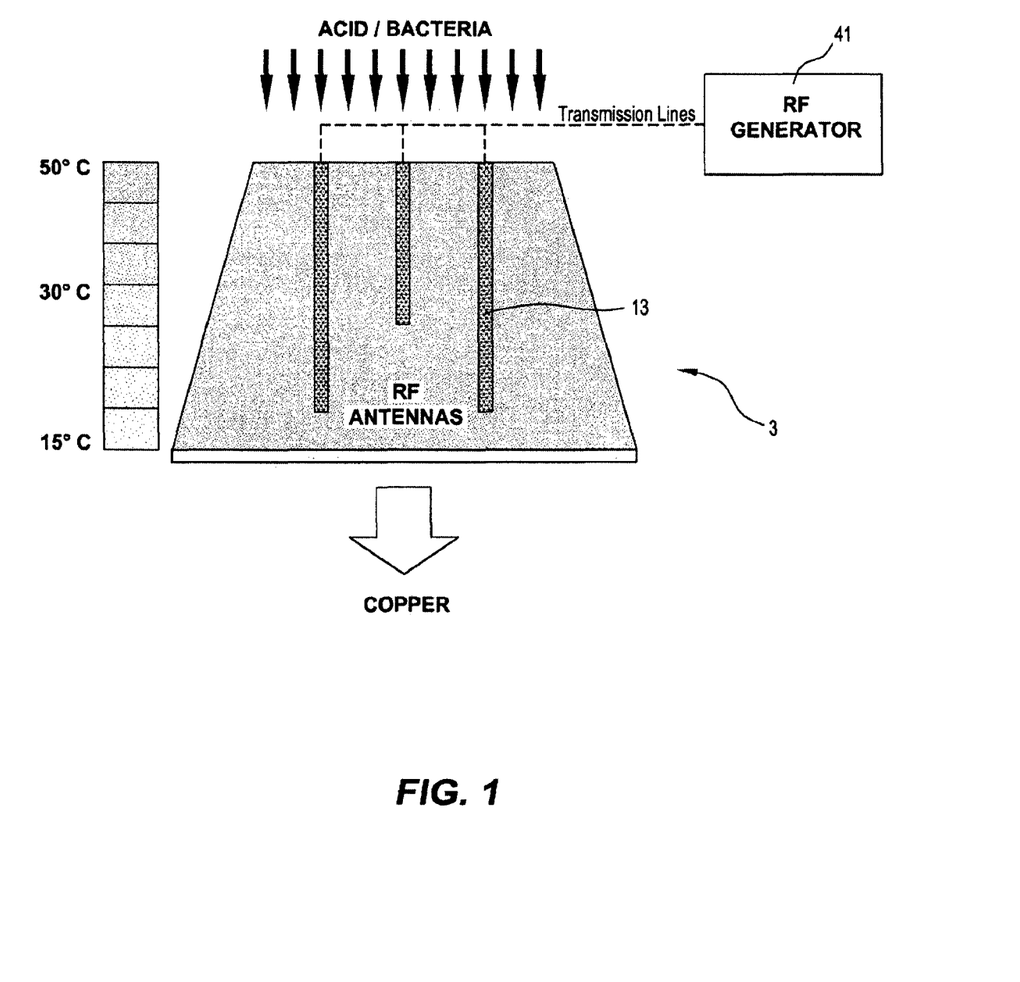
FIG. 1 is a diagram that illustrates a heap of a material containing a valuable metal to be leached in accordance with the present invention in general terms.

FIG. 1 is a diagram that illustrates in general terms a heap of a material containing a valuable metal to be leached in accordance with the method of the present invention. The heap shown in FIG. 1 is of the same type as that shown in FIGS. 4 and 5.

FIG. 1 illustrates a heap 3 that includes a series of electrodes 13 extending into the heap and a radio frequency generator 41 connected to the electrodes 13 via transmission lines. The Figure also shows leach liquor, in this instance containing bacteria, being supplied to the heap. An important feature of the Figure, which is evident from the colour coding of the heap and by reference to the temperature/colour scale on the left hand side of the Figure, is that the radio frequency energy transmitted from the electrodes 13 heats the heap to a temperature of 50° C. substantially through the heap, which facilitates leaching rate and recovery. This heating of the whole heap 3 is a result of electromagnetic energy producing near instantaneous, in situ, volumetric and phase selective heating of the leach solution in the heap and heat transfer via conduction from the liquor to the surrounding heap material.

Figure 6:
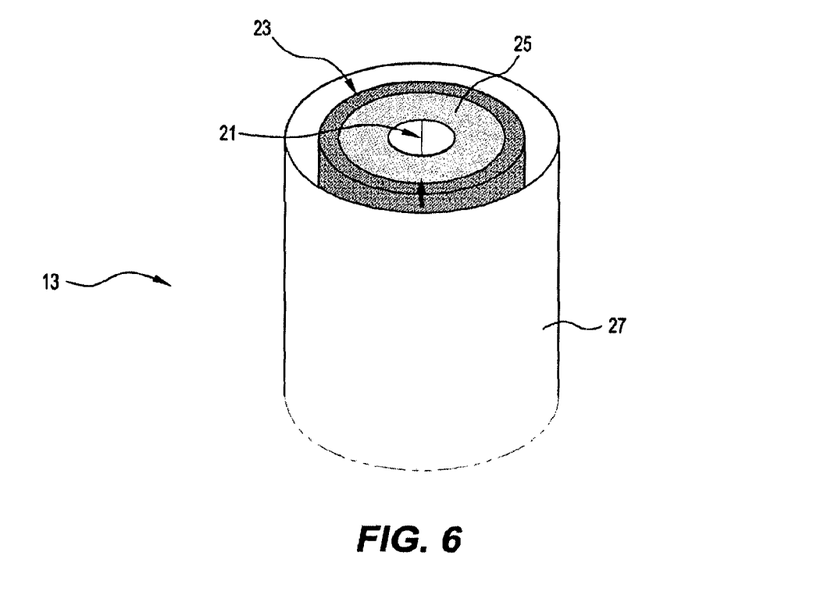
FIG. 6 is a diagram of part of one of the electrodes in the heap shown in FIGS. 4 and 5.

With reference to FIG. 6, each electrode 13 in the heap shown in FIGS. 4 and 5 is in the form of an elongate central conductor 21 and an outer coaxial conductor 23, with an annular gap 25 between the conductors 21, 23.

With further reference to FIG. 6, the electrode 13 is shown positioned in an outer sleeve 27, for example formed from a plastics material that is transparent to radio frequency radiation. The electrode is removably positioned in the sleeve 27. The outer sleeve 27 forms part of the heap shown in FIGS. 4 and 5. The outer sleeve 27 is a convenient housing for the electrode 13.

In the embodiment shown in FIGS. 4 and 5, there is one electrode 13 in each sleeve 27. In other embodiments of the invention, there may be deliberately more sleeves 27 than electrodes 13, and the electrodes 13 may be moved singly or in groups to selectively heat different sections of the heap. The electrodes are spaced to be between 4 and 8 meters from each other, and up to about a wavelength distance of the radio frequency.

It is also noted that the electromagnetic radiation system 3 may be operable to heat at different heating rates to achieve a given target temperature range in a section of the heap during the course of a heap leach operation. For example, it may be desirable to operate at a higher heating rate during a start-up phase of a heap leach operation than at a later stage in the operation.

It is also noted that the electromagnetic radiation system 3 may be responsive to other inputs in addition to heap temperature, such as changes in the pH and flow rate of leach liquor.

It is also noted that the arrangement, including the structure and the spacing of the electrodes 11 may readily be determined as required once the mineralogy and other characteristics of the materials in the heap and the pH and other characteristics of the leach liquor (such as flow rate) and the operational requirements for a given heap are established.

Figure 7:
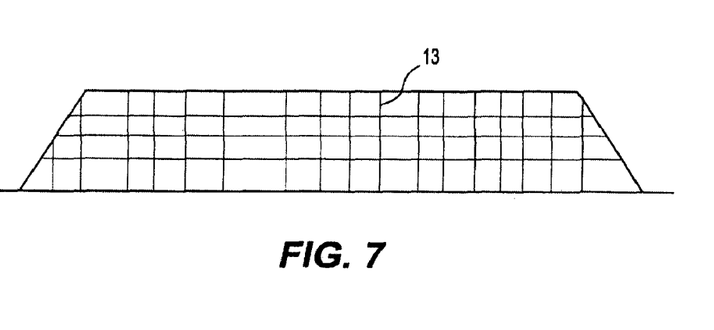
FIG. 7 is a side view of another embodiment of a heap of a material containing a valuable metal to be leached in accordance with the present invention which includes an outer mesh that acts as a shield for confining electromagnetic radiation within the heap.

The embodiment of the heap shown in FIG. 7 includes the same features as the heap shown in FIGS. 4 and 5.

The additional feature of the FIG. 7 heap is a shield in the form of steel mesh 25 arranged on the outside of the heap that forms a Faraday cage to prevent transmission of radio frequency radiation from the heap.

Figure 8:
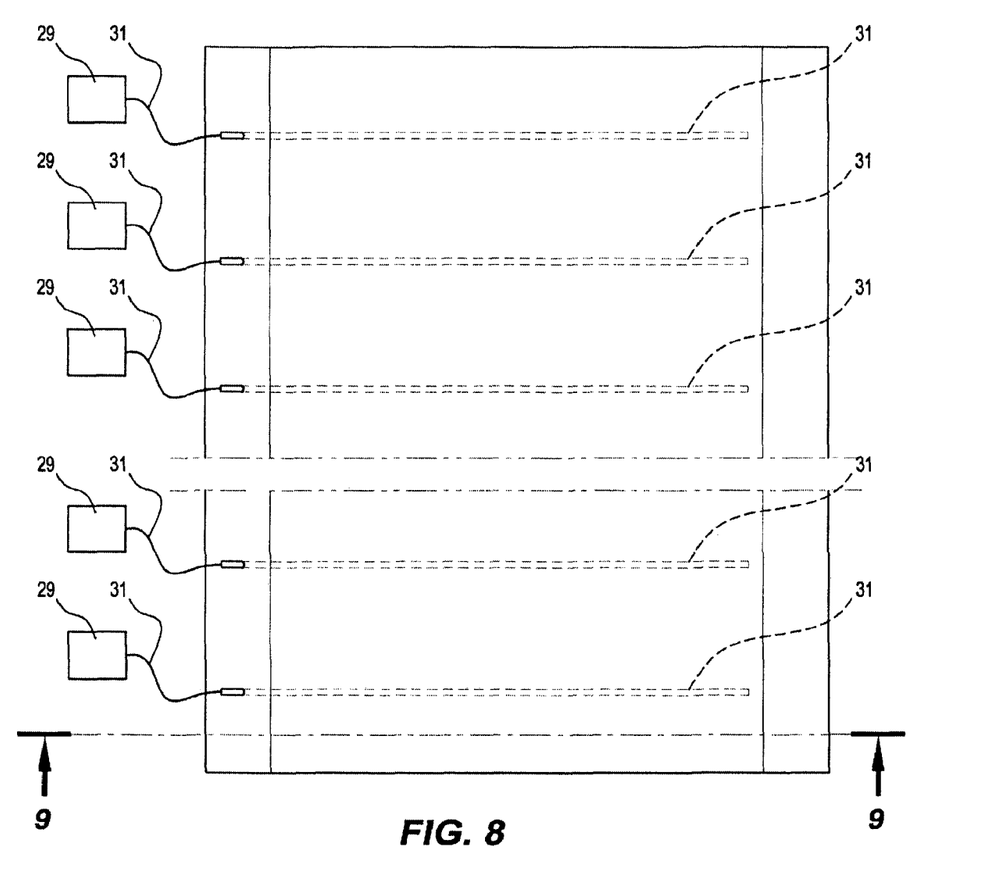
FIG. 8 is a top plan view of another embodiment of a heap of a material containing a valuable metal to be leached in accordance with the present invention.
Figure 9:
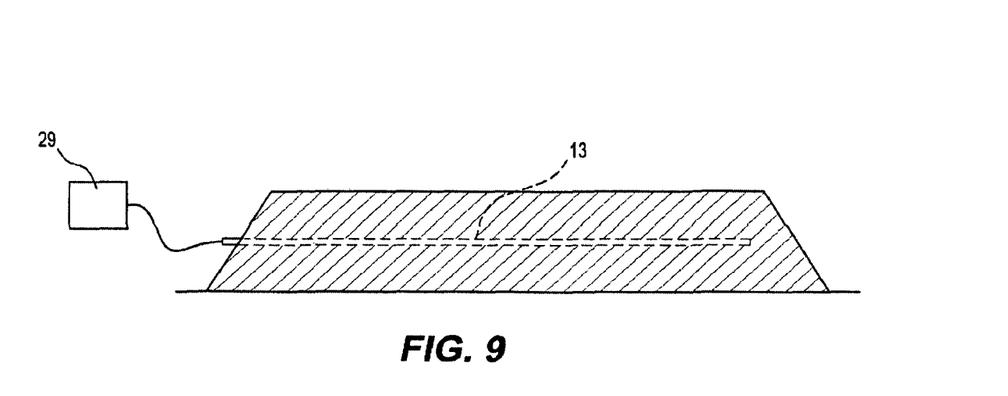
FIG. 9 is a cross-section along the line 9-9 in FIG. 8.

The embodiment of the heap shown in FIGS. 8 and 9 includes the same basic features as the heap shown in FIGS. 4 and 5.

The difference between the two heaps is that the electrodes 13 in the FIGS. 8 and 9 heap are positioned to extend horizontally into the heap from one side of the heap and are arranged at spaced intervals along the length of the heap, with each electrode 13 being connected to a separate radio frequency source 29 via transmission lines 31.

A heap leach method for each of the above-described embodiments of heaps includes the steps of (a) supplying a leach liquor to the heap to leach copper from the sulphidic copper-containing ore in the heap and (b) controlling the temperature in the heap by electromagnetic heating by exposing the heap to electromagnetic radiation to generate heat in situ in the heap during the course of the method. In any given situation, the selection of the required heating for the heap (including a target heap temperature or range of temperatures for the heap) during the course of a day and across a leach program will take into account a number of factors such as, for example, the leach liquor, the liquor flow rate, the characteristics of the material in the heap, such as the copper concentration and mineralisation of the copper, the bacteria used in the heap, and external temperatures. The method also includes monitoring the heap, including monitoring temperatures within and externally of the heap and controlling heating as required to maintain a target heap temperature or range of temperatures.

The advantages of the present invention include:

(a) direct selective heating of copper-containing minerals and leach liquor within a heap, without heating non-valuable gangue material in the heap;

(b) an opportunity for enhanced leaching operations through heating at the leach liquor and fragment interface;

(c) heating is easy to control via RF generator power input;

(d) very homogenous temperature throughout the whole heap possible;

(e) readily scaled-up to suit any sized heap;

(f) an opportunity for enhanced leaching operations through heating at the leach liquor and fragment interface;

(g) radio frequency generators and transmission cables are proven robust process technology components;

(h) an opportunity for leaching at higher rates, including during low external temperature periods;

(i) an opportunity to provide selective heating in a heap that may cause oxidation which may allow acceleration of reaction rates;

(j) heating into the structure of the ore fragments that may have a beneficial effect on creating fractures that facilitate leach liquor penetration and/or improving overall reaction times;

(k) an opportunity to operate with larger fragments and save comminution costs because the impact of electromagnetic radiation is greater for larger sized fragments;

(l) an opportunity to operate heaps independently of external temperature conditions;

(m) operating applicable for use on large heaps; and (k) confinement of electromagnetic radiation within a heap is a straightforward and inexpensive option.

It has been found that the initial heap temperature during start-up has a significant impact on the long term reaction rates in the heap. The electromagnetic heating system of the present invention is suitable for heating the heap during start-up to increase the initial and overall extraction rates.

Many modifications may be made to the embodiments of the present invention described above without departing from the spirit and scope of the invention.

By way of example, whilst the embodiments of the invention are described in the context of heap leaching a sulphidic copper-containing ore, the present invention is not confined to this type of ore and extends more generally to any material that includes a valuable metal.

By way of further example, whilst the embodiments of the invention are described in the context of an electromagnetic heating system that is based on exposing a heap to radio frequency radiation, the invention is not so limited and extends to exposing a heap to other bands of the electromagnetic radiation spectrum.

By way of further example, whilst the embodiments of the invention are described in the context of an electromagnetic heating system that is based on exposing a heap to electromagnetic radiation, particularly radio frequency radiation, the invention is not so limited and extends to other types of electromagnetic heating system that are based on the use of an electromagnetic field to generate heat directly or indirectly in a heap of a material.

By way of further example, whilst the embodiments of the invention include a particular from of the electrodes and particular arrangements of the electrodes in heaps, the invention is not so limited and extends to any suitable electrode configurations and arrangements of electrodes.

The invention claimed is:

1. A heap of a material to be leached to recover a valuable metal from the material, the heap including an electromagnetic heating system to generate heat in situ in the heap, wherein the electromagnetic heating system includes a shield to confine electromagnetic radiation within the heap, and wherein the shield is in the form of metal mesh on the outside of the heap that acts as a Faraday cage that prevents electromagnetic radiation being transmitted outside the heap.

2. The heap defined in claim 1 wherein the electromagnetic heating system is operable to heat a leach liquor and minerals containing a valuable metal throughout at least 90% of the heap.

3. The heap defined in claim 1 wherein the material is a sulphidic ore containing a valuable metal.

4. The heap defined in claim 3 wherein the metal is copper.

5. The heap defined in claim 1 wherein the electromagnetic heating system is in the form of a system for exposing the heap to radio frequency radiation to generate heat in situ in the heap.

6. The heap defined in claim 5 wherein the system for exposing the heap to radio frequency radiation includes a series of spaced-apart electrodes positioned in the heap and an electrical source connected to the electrodes that is operable to generate currents that oscillate at radio frequencies.

7. The heap defined in claim 6 wherein the electrodes are arranged to extend vertically into the heap.

8. The heap defined in claim 5 wherein the system for exposing the heap to radio frequency radiation is operable to selectively heat leach liquor in the heap.

9. The heap defined in claim 5 wherein the material in the heap includes sulphidic copper-containing ore with chalcopyrite as a copper-containing mineral in the ore and the system for exposing the heap to radio frequency radiation is operable to heat heap liquor to at least 50° C.

10. The heap defined in claim 5 wherein the material in the heap includes sulphidic copper-containing ore with chalcopyrite as a copper-containing mineral in the ore and the system for exposing the heap to radio frequency radiation is operable to heat heap liquor to less than 85° C.

11. A heap of a material to be leached to recover a valuable metal from the material, the heap including an electromagnetic heating system in the form of a system for exposing the heap to radio frequency radiation to generate heat in situ in the heap.

12. The heap defined in claim 11 wherein the system for exposing the heap to radio frequency radiation is operable to selectively a heat leach liquor in the heap.

13. The heap defined in claim 11 wherein the material in the heap includes a sulphidic copper-containing ore with chalcopyrite as a copper-containing mineral in the ore and the system for exposing the heap to radio frequency radiation is operable to heat a heap liquor to at least 50° C.

14. The heap defined in claim 11 wherein the material in the heap includes sulphidic copper-containing ore with chalcopyrite as a copper-containing mineral in the ore and the system for exposing the heap to electromagnetic radiation is operable to heat a heap liquor to less than 85° C.

15. The heap defined in claim 5 wherein the radio frequency radiation is in a lower frequency end of the radio frequency radiation band of radiation.

16. The heap defined in claim 15 wherein the lower frequency end of the radio frequency radiation band of radiation is 5-45 MHz.

17. The heap defined in claim 11 wherein the electromagnetic heating system is operable to heat a leach liquor and minerals containing a valuable metal throughout at least 90% of the heap.

18. The heap defined in claim 11 wherein the radio frequency radiation is in a lower frequency end of the radio frequency radiation band of radiation.

19. The heap defined in claim 18 wherein the lower frequency end of the radio frequency radiation band of radiation is 5-45 MHz.

20. The heap defined in claim 11 wherein the system for exposing the heap to radio frequency radiation includes a series of spaced-apart electrodes positioned in the heap and an electrical source connected to the electrodes that is operable to generate currents that oscillate at radio frequencies.

21. The heap defined in claim 20 wherein the electrodes are arranged to extend vertically into the heap.

22. The heap defined in claim 11 wherein the electromagnetic heating system includes a shield to confine the radio frequency radiation within the heap.

23. The heap defined in claim 22 wherein the shield is in the form of metal mesh on the outside of the heap that acts as a Faraday cage that prevents electromagnetic radiation being transmitted outside the heap.

24. The heap defined in claim 11 wherein the material is a sulphidic ore containing a valuable metal.

25. The heap defined in claim 24 wherein the metal is copper.

* * * * *